(12) United States Patent
Murota (10) Patent No.: US 10,758,985 B2
(45) Date of Patent: Sep. 1, 2020

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/550,683

(22) Filed: Aug. 26, 2019

(65) Prior Publication Data

US 2020/0070251 A1 Mar. 5, 2020

(30) Foreign Application Priority Data

Aug. 31, 2018 (JP) ................. 2018-163130

(51) Int. Cl.
*F16C 32/06* (2006.01)
*B23B 19/02* (2006.01)
(Continued)

(52) U.S. Cl.
CPC ............... *B23B 3/06* (2013.01); *B23Q 1/015* (2013.01); *B23Q 1/70* (2013.01); *B23Q 11/005* (2013.01); *B23Q 2220/006* (2013.01); *F16C 19/545* (2013.01); *F16C 32/06* (2013.01); *F16C 33/72* (2013.01)

(58) Field of Classification Search
CPC .............. B23Q 2705/026; B23Q 5/043; B23Q 11/005; B23Q 11/127; B23Q 3/088; B23Q 11/0883; B23Q 1/70; B23Q 2220/006; B23Q 11/141; B23Q 5/10; B23Q 2210/004; B23Q 2705/02–2705/068; B23Q 2705/023; B23B 3/06; B23B 19/02; F16C 32/06; F16C 2322/39; F16C 19/545; F16C 33/72; Y10T 409/309352
See application file for complete search history.

(56) References Cited

U.S. PATENT DOCUMENTS 4,831,785 A * 5/1989 Sigg ..................... B23Q 15/225
409/186
6,038,948 A * 3/2000 Link ..................... B23B 31/302
279/114
(Continued)

FOREIGN PATENT DOCUMENTS

JP 08061367 A * 3/1996
JP 2006336826 A * 12/2006 .......... F16C 32/0696
(Continued)

OTHER PUBLICATIONS

English Translation JP 8-61367 Inventor Fujisaki et al (Year: 1996).*

(Continued)

*Primary Examiner* — Sara Addisu
(74) *Attorney, Agent, or Firm* — Fredrikson & Byron, P.A.

(57) ABSTRACT

In a spindle device, a movable member is provided on a cover member, which is attached to a spindle housing and covers the outer peripheral surface of a chuck portion which is a disk-shaped rotating member. The movable member is moved by a gas flowing through a flow passage formed in the cover member and thereby brought into contact with the chuck portion. The movable member is electrically connected to a ground.

5 Claims, 8 Drawing Sheets

(51) Int. Cl.
  *B23B 3/06* (2006.01)
  *B23Q 1/01* (2006.01)
  *B23Q 11/00* (2006.01)
  *F16C 33/72* (2006.01)
  *B23Q 1/70* (2006.01)
  *F16C 19/54* (2006.01)

(56) References Cited

U.S. PATENT DOCUMENTS

| | | | | |
|---|---|---|---|---|
| 6,827,631 | B2 * | 12/2004 | Tomotaki | B24B 1/00 |
| | | | | 409/165 |
| 2003/0094864 | A1 * | 5/2003 | Watanabe | B23Q 11/0883 |
| | | | | 310/58 |
| 2011/0280679 | A1 | 11/2011 | Morimura | |
| 2015/0033918 | A1 * | 2/2015 | Lindner | B23Q 16/00 |
| | | | | 82/1.11 |
| 2020/0001415 | A1 * | 1/2020 | Murota | B23Q 11/127 |

FOREIGN PATENT DOCUMENTS

| | | | |
|---|---|---|---|
| JP | 2008175273 A | * | 7/2008 |
| JP | 2011240428 A | | 12/2011 |

OTHER PUBLICATIONS

English Abstract for Japanese Publication No. 2011-240428 A, published Dec. 1, 2011, 2 pgs.

* cited by examiner

SPINDLE DEVICE

CROSS-REFERENCE TO RELATED APPLICATION

This application is based upon and claims the benefit of priority from Japanese Patent Application No. 2018-163130 filed on Aug. 31, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are cases where a spindle housing or the like for accommodating a spindle shaft is thermally deformed due to heat generated during machining on a workpiece, and such thermal deformation causes decrease in machining accuracy. It is therefore important to take countermeasures to suppress the thermal deformation.

For example, Japanese Laid-Open Patent Publication No. 2011-240428 discloses a cooling structure for cooling a spindle by providing coolant passages both in the housing and the spindle so as to circulate a coolant from the coolant passage in the housing to the coolant passage in the spindle and thereby flow the coolant through the inside of the spindle.

SUMMARY OF THE INVENTION

In Japanese Laid-Open Patent Publication No. 2011-240428, the spindle shaft is supported by bearings inside the spindle housing. When the bearings are of a hydrostatic type, the spindle shaft is supported in a non-contact manner inside the spindle housing, so that the spindle shaft is insulated from the spindle housing. In this case, if static electricity is generated on the spindle shaft, static charge is likely to build up on the spindle shaft. As a result, there is a risk that a disaster may be caused due to the static charge.

It is therefore an object of the present invention to provide a spindle device which is excellent in safety.

According to an aspect of the present invention, a spindle device includes: a spindle housing; a conductive spindle shaft rotatably supported inside the spindle housing; a conductive disk-shaped rotating member provided at one end of the spindle shaft and configured to be rotatable on a surface of the spindle housing on one end side of the spindle shaft; a cover member attached to the spindle housing and configured to cover the outer peripheral surface of the disk-shaped rotating member; a flow passage formed in the cover member and configured to flow a gas from the outside of the cover member to the clearance between the disk-shaped rotating member and the cover member; and a conductive movable member provided on the cover member or the spindle housing so as to be electrically connected to a ground and configured to be moved by the gas flowing through the flow passage and thereby brought into contact with the disk-shaped rotating member.

According to the present invention, since the movable member is electrically connected to the spindle shaft and the disk-shaped rotating member, even if static electricity are generated on the spindle shaft and the disk-shaped rotating member, it is possible to dissipate the static charges to the ground through the movable member. With this configuration, it is possible to provide a spindle device excellent in safety.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
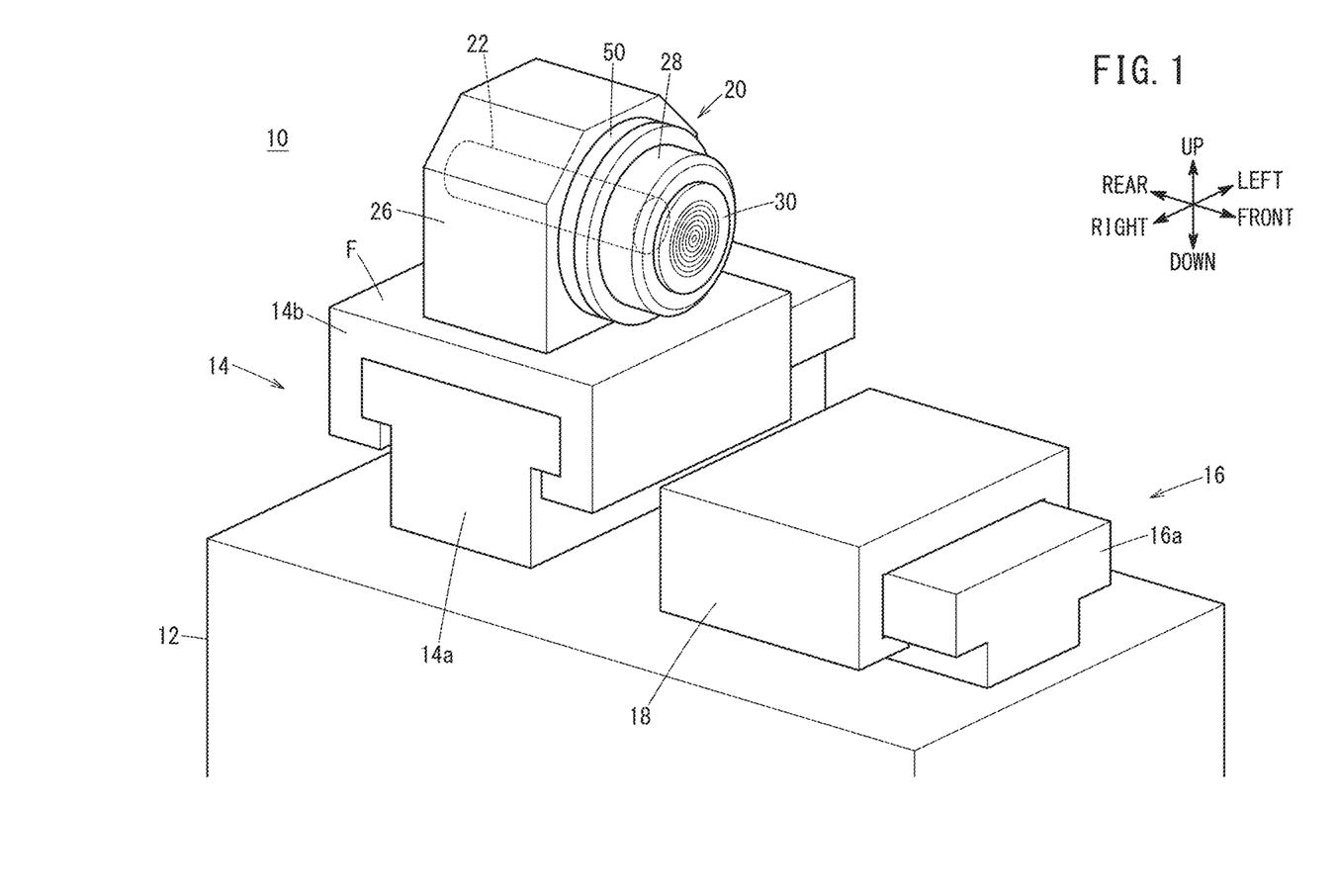
FIG. 1 is a schematic view showing the external configuration of a lathe according to the present embodiment.

FIG. 1 is a schematic view showing the external configuration of a lathe machine 10. The lathe machine 10 is used to machine a workpiece to be machined using a tool, and includes a base bed 12, a spindle support 14, a table support 16, a table 18 and a spindle device 20.

The spindle support 14 is provided on the base bed 12 to support the spindle device 20 so that it can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted is referred to as the left-right direction, and the direction perpendicular to the mounting surface F and the axial direction is referred to as the up-down direction. The downward direction is the direction of gravity. Further, in the spindle device 20, one end side of the spindle shaft 22 on which a chuck portion 30 is arranged is defined as the front side, whereas the other end side of the spindle shaft 22 is defined as the rear side.

The spindle support 14 includes a first slider 14a provided along the left-right direction on the base bed 12, a spindle carriage 14b movable along the first slider 14a, and an unillustrated first drive mechanism for driving the spindle carriage 14b.

The first drive mechanism includes a motor and components such as a ball screw and others that convert the rotational motion of the motor into a linear motion. As the spindle carriage 14b is moved along the first slider 14a by the first drive mechanism, the spindle device 20 on the spindle carriage 14b is moved left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In this embodiment, it is assumed that the workpiece is held by the chuck portion 30 of the spindle device 20 and the tool is held by the table 18. However, the tool may be held by the chuck portion 30 of the spindle device 20 and the workpiece may be held by the table 18.

Figure 2:
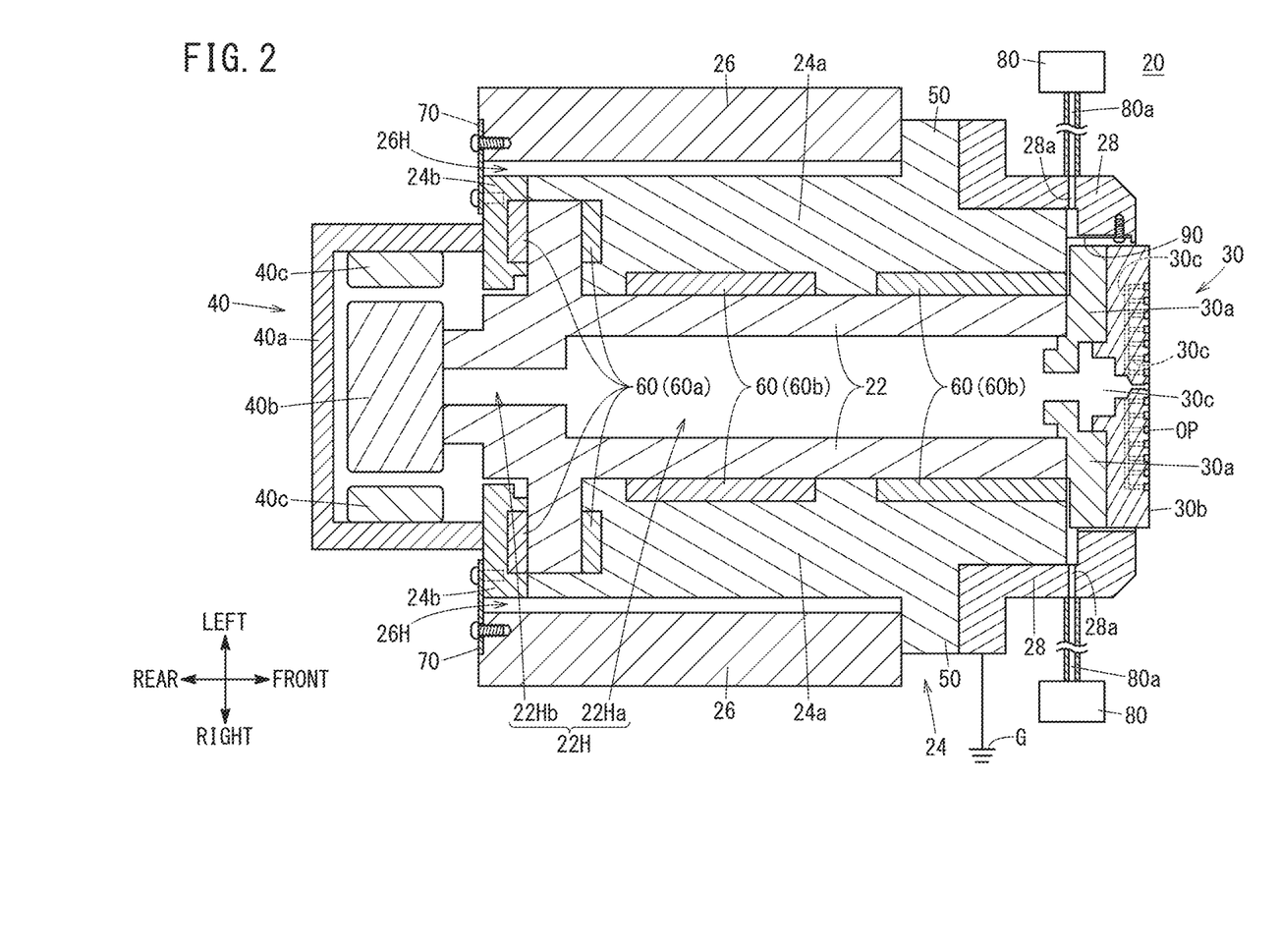
FIG. 2 is a schematic view showing a cross-sectional view of a spindle device of FIG. 1.

FIG. 2 is a schematic sectional view showing the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26, and a cover member 28.

The spindle shaft 22 is a cylindrically-shaped conductive member and has a cylindrical through-hole 22H penetrating therethrough in the axial direction. In the example shown in FIG. 2, the through-hole 22H has a front side through-hole 22Ha and a rear side through-hole 22Hb having a diameter smaller than that of the front side through-hole 22Ha. The chuck portion 30 is arranged on one end (front side) of the spindle shaft 22, and a motor 40 is provided on the other end (rear side).

The chuck portion 30 is a conductive, disk-shaped rotating member that is provided at the one end of the spindle shaft 22 so as to be rotatable in conjunction with rotation of the spindle shaft 22, on the front surface of the spindle housing 24, and in the present embodiment, the chuck portion 30 holds and releases the workpiece. The chuck portion 30 has a base 30a fixed on the front side of the spindle shaft 22 and a suction pad 30b detachably attached to the base 30a. The suction pad 30b has openings OP formed in a suctioning face thereof. The base 30a and the suction pad 30b contain therein a communication passage 30c to establish communication between openings OP and one end of the through-hole 22H in the spindle shaft 22. In the chuck portion 30, air outside the chuck portion 30 is drawn into the through-hole 22H from the openings OP through the communication passage 30c by an unillustrated vacuum pump, so as to keep and hold the workpiece in close contact with the suctioning face.

The motor 40 is a drive source of the spindle shaft 22 and includes a motor case 40a attached on the rear side of the spindle housing 24, and also includes a rotor 40b and a stator 40c provided inside the motor case 40a. The spindle shaft 22 is fixed to the rotor 40b. Therefore, the spindle shaft 22 rotates together with the rotor 40b.

The spindle housing 24 is formed of a conductive material, and includes a substantially cylindrical housing body 24a and a rear housing lid 24b. The housing body 24a is provided with an annular flange portion 50 projecting outward from the outer peripheral surface of the housing body 24a. The flange portion 50 may be integrally formed with the housing body 24a, or may be formed separately from the housing body 24a and fixed to the housing body 24a by predetermined fasteners.

The rear housing lid 24b is removably attached on the rear side of the housing body 24a so as to cover the opening on the rear of the housing body 24a. The motor case 40a of the motor 40 is fixed to the outer (rear endface) side of the rear housing lid 24b.

A substantially cylindrical space for shaft arrangement is defined by the rear housing lid 24b and the housing body 24a so as to extend therethrough in the front-rear direction. The spindle shaft 22 is arranged in the shaft arrangement space, and the spindle shaft 22 arranged in the shaft arrangement space is rotatably supported by bearings 60.

The bearings 60 are of a hydrostatic type, and include thrust bearings 60a and radial bearings 60b in this embodiment. The thrust bearings 60a are arranged on the left and right sides of the spindle shaft 22. The radial bearings 60b are provided on the front and rear sides of a front portion of the spindle shaft 22 that is located at the front side of the thrust bearings 60a.

The bearing 60 is supplied with a lubricant fluid via an unillustrated flow path formed in the spindle housing 24. The lubricant fluid may be a compressed gas, i.e., air or another gas that is compressed at a predetermined pressure, or may be an incompressible liquid such as oil. The lubricant fluid supplied to the bearing 60 flows from the bearing 60 to the shaft arrangement space and functions as a support for the spindle shaft 22. Therefore, the bearing 60 and the spindle shaft 22 are not in contact with each other via the lubricant fluid. The lubricant gas entering the shaft arrangement space is discharged to the outside through an unillustrated discharge path formed in the spindle housing 24.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted in the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one end that is closer to one opening of the insertion cavity 26H) of the spindle mount 26 by rod-shaped fasteners such as bolts. On the other hand, the support member 70 supports the spindle housing 24 by using, as a base, the rear side (the other end that is closer to the other opening of the insertion cavity 26H) of the spindle mount 26. That is, the spindle housing 24 is supported on the spindle mount 26 at two ends, i.e., at front and rear of the spindle housing 24.

The cover member 28 is a cover member whose temperature is adjusted. The cover member 28 is provided on the front side of the spindle device 20. Specifically, the cover member 28 is provided so as to cover the front-side surface of the flange portion 50, the outer peripheral surface of the housing body 24a extending forward from the front-side surface, and part of the outer peripheral surface of the chuck portion 30. Although the cover member 28 covers part of the outer peripheral surface of the chuck portion 30, it may be arranged so as to cover the whole of the outer peripheral surface. The cover member 28 is conductive and connected to the ground G.

The cover member 28 has, formed therein, a flow passage 28a for flowing the seal gas from the outer peripheral surface of the cover member 28 to the clearance between the chuck portion 30 and the cover member 28 and the clearance between the housing body 24a and the cover member 28. A hose 80a from a compressor 80 is connected to the inlet of the flow passage 28a. Therefore, the seal gas supplied from the compressor 80 sequentially passes through the hose 80a and the flow passage 28a and reaches the destination of gas supply, i.e., the clearance between the chuck portion 30 and the cover member 28. Part of the seal gas that has flowed into the clearance is discharged to the outside. In FIG. 1, the compressor 80 and the opening of the flow passage 28a are not illustrated.

The seal gas is a gas for sealing the aforementioned clearance, and is, for example, a compressed gas such as air or another gas that is compressed to a predetermined pressure. By supplying the seal gas to the clearance, it is possible to prevent chips generated during machining of the workpiece, coolant used at the time of machining, etc., from entering the interior (shaft arrangement space) of the spindle housing 24 through the clearance.

Figure 3:
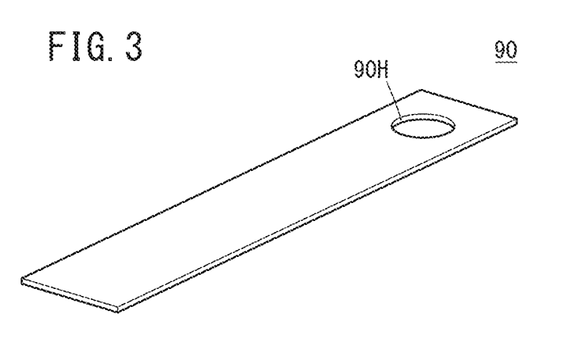
FIG. 3 is a view showing a movable member of FIG. 2.

Further, the cover member 28 is provided with a movable member 90 for dissipating the static electricity generated on the spindle shaft 22 or the chuck portion 30 to the ground G. FIG. 3 is a view showing the movable member 90. The movable member 90 is formed into a substantially rectangular plate shape and has resilience. One end of the movable member 90 is fixed to the cover member 28, whereas the other end of the movable member 90 is disposed in the flow passage 28a formed in the cover member 28. The movable member 90 has a through hole 90H formed in the one end (fixed end).

Figure 4:
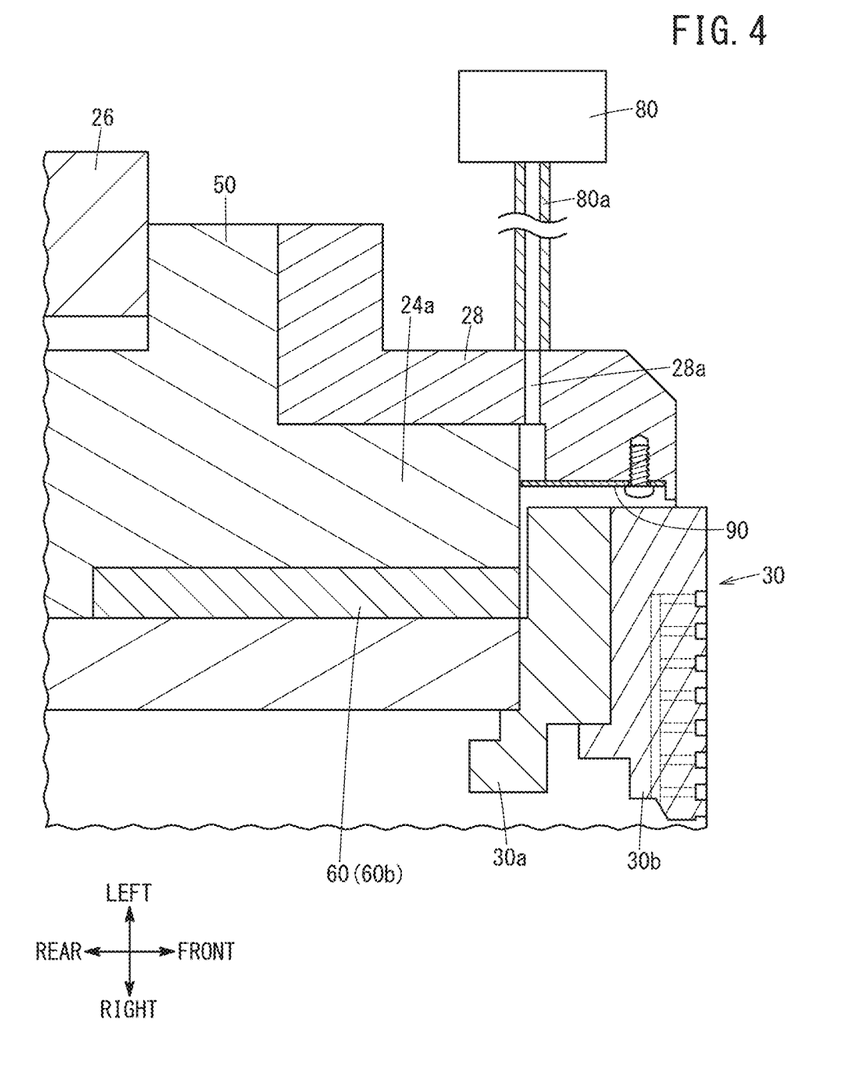
FIG. 4 is an enlarged view showing part of FIG. 2.

FIG. 4 is an enlarged view of part of FIG. 2, specifically showing the portion where the movable member 90 is disposed. The one end (fixed end) of the movable member 90 is detachably fixed to a surface of the cover member 28 that faces the outer peripheral surface of the chuck portion 30, by a rod-shaped fastener such as a screw inserted in the through hole 90H (see FIG. 3).

The other end of the movable member 90 is a free end, protruding toward the flow passage 28a formed in the cover member 28, and is disposed so as to close part of the outlet of the flow passage 28a. That is, the other end of the movable member 90 is disposed in the flow passage 28a so that one surface of the other end of the plate-shaped movable member 90 functions as a pressure receiving surface for receiving the pressure of the seal gas flowing through the flow passage 28a.

Figure 5:
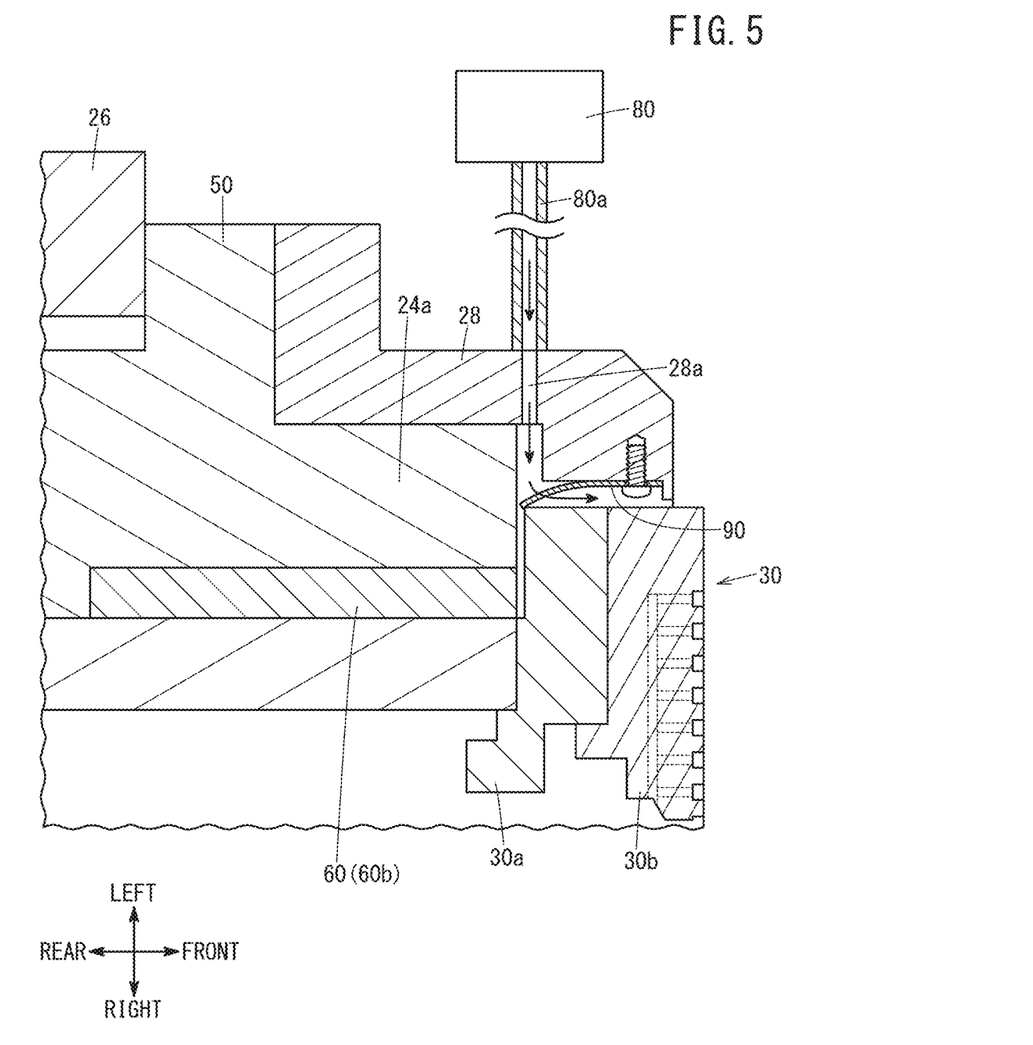
FIG. 5 is a view showing a state in which a movable member creates a conductive path.

FIG. 5 is a view showing a state in which the movable member 90 creates a conductive path. As the seal gas flows into the flow passage 28a, the other end of the movable member 90 is pushed by the seal gas flowing into the flow passage 28a. As a result, the movable member 90 having resilience is bent in the flowing direction of the seal gas, and the other end of the movable member 90 contacts the chuck portion 30. Therefore, the chuck portion 30 and the spindle shaft 22 to which the chuck portion 30 is connected are brought into electric connection, via the movable member 90, with the cover member 28 which is connected to the ground G (see FIG. 2). As result, static electricity generated on the chuck portion 30 and/or the spindle shaft 22 flows to the ground G through the cover member 28.

[Modifications]

Though the above embodiment has been described as one example of the present invention, the technical scope of the present invention should not be limited to the above embodiment. It goes without saying that various modifications and improvements can be added to the above embodiment. It is also apparent from the scope of the claims that embodiments added with such modifications and improvements should be incorporated in the technical scope of the invention. Examples in which the above embodiment is modified or improved will be described below.

(Modification 1)

Figure 6:
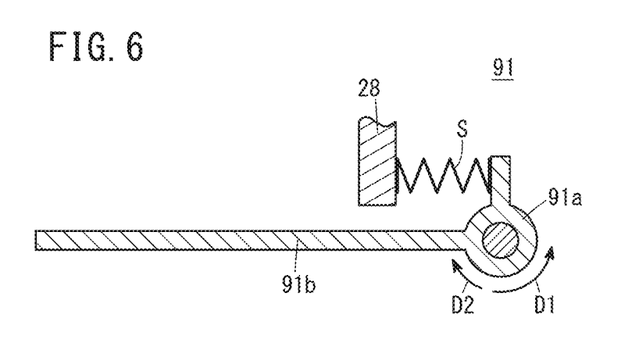
FIG. 6 is a view showing a movable member of Modification 1.

FIG. 6 is a view showing a movable member 91 of Modification 1. The movable member 91 according to Modification 1 has a disk portion 91a rotatably fixed to the cover member 28 and a rod-shaped portion 91b connected to the disk portion 91a. The disk portion 91a has a projecting piece jutting outward from the outer periphery while a spring S is provided between the projecting piece and a portion of the cover member 28 formed as a stopper.

The rod-shaped portion 91b is disposed so as to partly protrude into the flow passage 28a. The rod-shaped portion is pushed by the seal gas flowing into the flow passage 28a, thereby moving in the flow direction of the seal gas and coming into contact with the chuck portion 30. The disk portion 91a rotates in a first direction D1 to compress the spring S as the rod-shaped portion 91b moves. When the seal gas stops flowing into the flow passage 28a, the spring S returns to the natural length, so that the disk portion 91a rotates in the second direction, designated at D2, opposite to the first direction D1. Thus, the rod-shaped portion 91b returns to the original position.

Also in the case that the movable member 91 of Modification 1 is employed, it is possible to dissipate static electricity generated on the chuck portion 30 and/or the spindle shaft 22 to the ground G through the cover member 28, similarly to the above embodiment.

(Modification 2)

Figure 7:
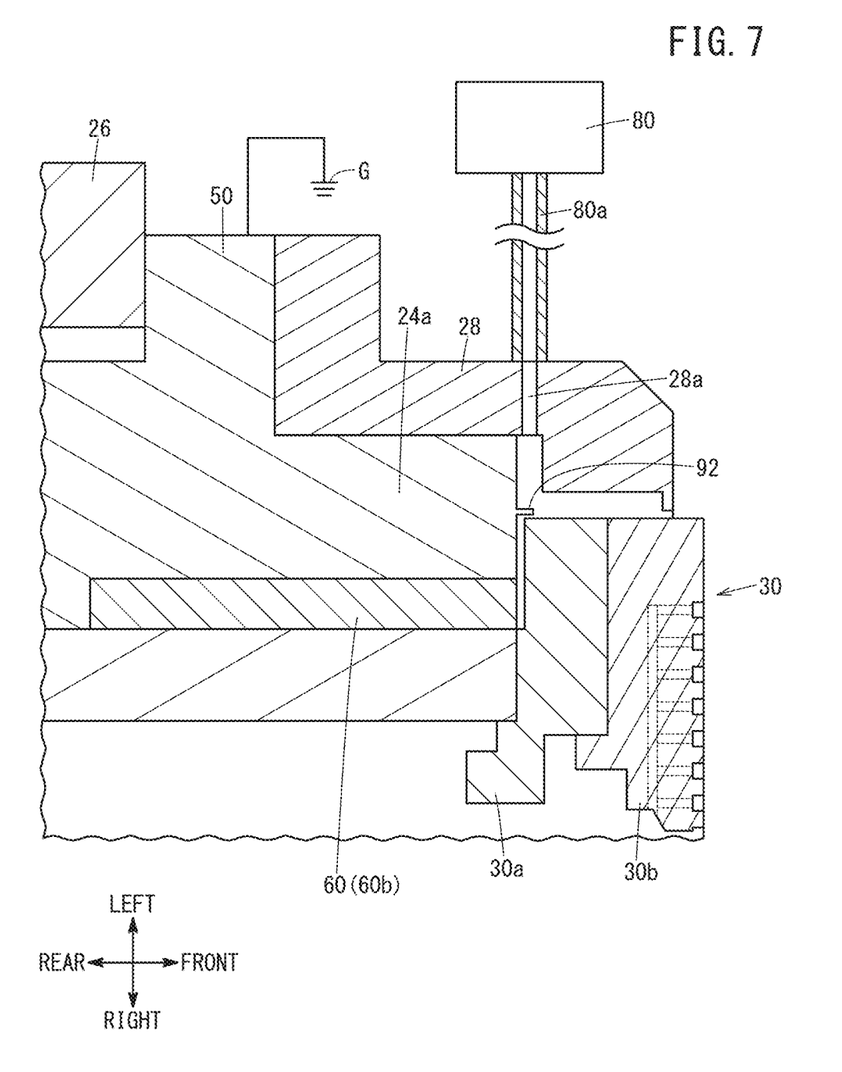
FIG. 7 is a view showing a movable member of Modification 2.

FIG. 7 is a view showing a movable member 92 of Modification 2. The movable member 92 of Modification 2 is integrally formed with the housing body 24a. The movable member 92 is a plate-shaped member that protrudes into the clearance between the chuck portion 30 and the cover member 28 so as to receive the pressure of the seal gas flowing through the flow passage 28a. Upon being pressed by the seal gas, the movable member 92 is bent and brought into contact with the chuck portion 30. Thus, the chuck portion 30 and the spindle shaft 22 provided with the chuck portion 30 are brought into electric connection via the movable member 92 with the housing body 24a connected to the ground G.

Therefore, use of the movable member 92 of Modification 2 also makes it possible to dissipate static charges generated on the chuck portion 30 and/or the spindle shaft 22 to the ground G through the cover member 28 as in the above embodiment. The movable member 92 may be separated from the housing body 24a and may be fixed to the housing body 24a by predetermined fasteners.

(Modification 3)

Figure 8:
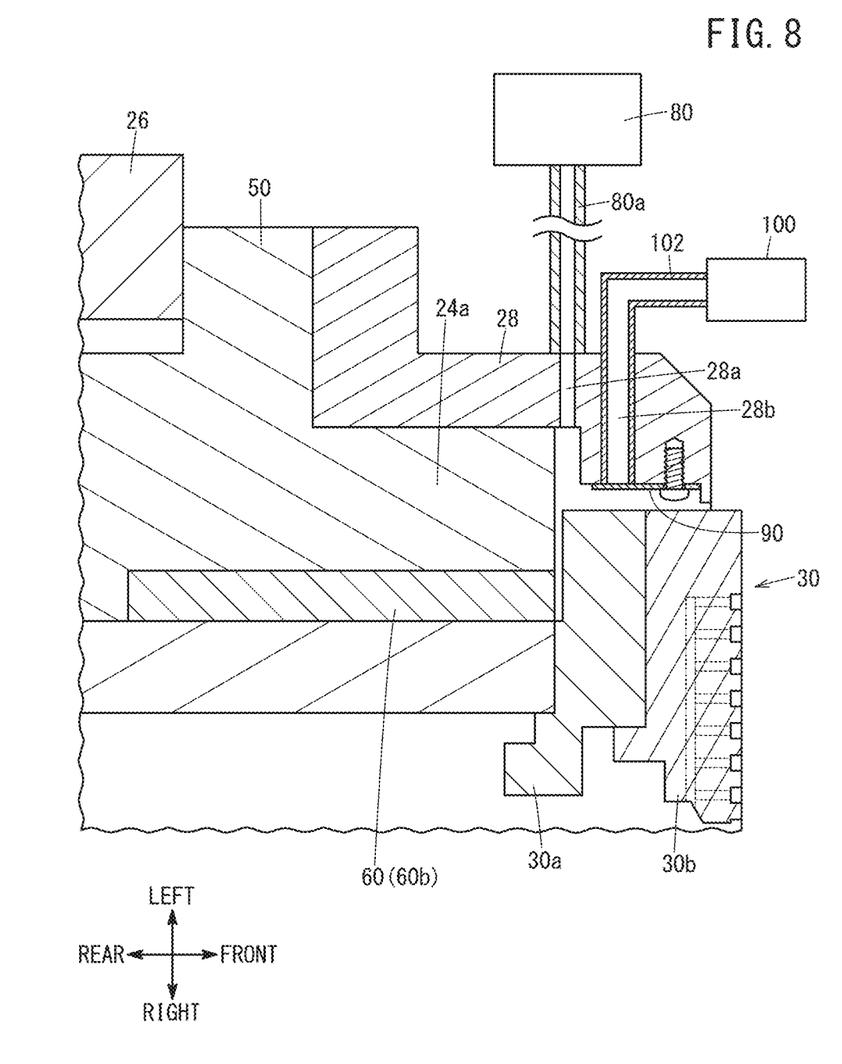
FIG. 8 is a view showing a movable member of Modification 3.

FIG. 8 is a view showing a spindle device 20 of Modification 3. In the spindle device 20 of Modification 3, another flow passage 28b for flowing a gas for moving a movable member 90 is formed in the cover member 28, in addition to the flow passage 28a for flowing the seal gas. A dedicated compressor 100 for supplying a gas for the purpose of moving the movable member 90 is connected to the inlet of the flow passage 28b via a communication pipe 102. In addition, the movable member 90 is arranged on the cover member 28 so that the other end of the movable member 90 closes part of the outlet of the flow passage 28b.

In the spindle device 20 of Modification 3, the gas supplied from the compressor 100 flows into the flow passage 28b via the communication pipe 102, and the other end of the movable member 90 is pressed by the gas flowing through the flow passage 28b. As a result, the movable member 90 is bent to contact the chuck portion 30. In this way, the movable member 90 may be moved using a gas other than the seal gas.

(Modification 4)

In the above embodiment, the movable member 90 is provided on the cover member 28 by fixing the movable member 90 to the cover member 28 by the rod-shaped fastener. However, a portion of the movable member 90 other than a portion thereof disposed in the flow passage 28a may be integrally formed as the cover member 28.

(Modification 5)

In the above embodiment, the movable member 90 is electrically connected to the ground G via the conductive cover member 28. However, in the case where the cover member 28 is formed of a nonmetallic member, the movable member 90 may be electrically connected to the ground G by a wire.

(Modification 6)

Though no controller that controls the flow velocity or flow rate of the seal gas supplied from the compressor 80 is provided in the above embodiment, such a controller may be provided. Use of the controller makes it possible to change the contact resistance of the movable member 90 to the chuck portion 30 by controlling the flow velocity or the flow rate of the seal gas. In this way, it is possible to appropriately adjust the contact resistance between the movable member 90 and the chuck portion 30.

(Modification 7)

The above embodiment and modifications may be combined arbitrarily as long as no technical inconsistency occurs.

[Technical Ideas]

Technical ideas that can be grasped from the above embodiment and modifications will be described below.

The spindle device (20) includes: a spindle housing (24); a conductive spindle shaft (22) rotatably supported inside the spindle housing (24); a conductive disk-shaped rotating member (30) provided at one end of the spindle shaft (22) and configured to be rotatable on the surface of the spindle housing (24) on the one end side of the spindle shaft (22); and a cover member (28) attached to the spindle housing (24) and configured to cover the outer peripheral surface of the disk-shaped rotating member (30).

The cover member (28) has, formed therein, a flow passage (28a, 28b) for flowing a gas from the outside of the cover member (28) to the clearance between the disk-shaped rotating member (30) and the cover member (28).

The cover member (28) or the spindle housing (24) is provided with a conductive movable member (90 to 92) that is configured to be moved by the gas flowing through the flow passage (28a, 28b) and thereby brought into contact with the disk-shaped rotating member (30). The movable member (90 to 92) is electrically connected to a ground (G).

In this spindle device (20), the movable member (90 to 92) is electrically connected to the spindle shaft (22) and the disk-shaped rotating member (30). Accordingly, even if static electricity is generated on the spindle shaft (22) and the disk-shaped rotating member (30), it is possible to dissipate the static charges to the ground (G) through the movable member (90 to 92). Owing thereto, it is possible to provide a spindle device (20) excellent in safety.

The flow passage (28a) may be a flow path for flowing the gas that seals the clearance between the disk-shaped rotating member (30) and the cover member (28). This configuration makes it possible to use the gas for sealing the clearance between the disk-shaped rotating member (30) and the cover member (28) as a gas for bringing the movable members (90 to 92) into contact with the disk-shaped rotating member (30). As a result, it is possible to greatly reduce the amount of consumed gas, compared to the case where the gas for sealing the gap and the gas for bringing the movable members (90 to 92) into contact with the disk-shaped rotating member (30) are separately used.

The movable member (90, 92) may have resilience and be configured to be bent by the gas flowing through the flow passage (28a, 28b) and thereby contact the disk-shaped rotating member (30). As a result, without providing a complicated moving mechanism for the movable member (90, 92), it is possible to bring the movable member (90, 92) into contact with the disk-shaped rotating member (30). Thus, the spindle device (20) can be made compact.

The movable member (90) may be formed into a plate shape, and one end side of the movable member (90) may be detachably fixed to the cover member (28) while the other end side thereof may be moved by the gas flowing through the flow passage (28a, 28b). This configuration makes it to replace the movable member (90).

The other end side of the movable member (90) may be disposed so as to close part of the outlet of the flow passage (28a, 28b). This arrangement enables the movable member to receive a greater amount of gas flowing through the flow passage (28a, 28b), and hence the movable part can be easily moved by the pressure of the gas.

The present invention is not particularly limited to the embodiment described above, and various modifications are possible without departing from the essence and gist of the present invention.

What is claimed is:

1. A spindle device comprising:
a spindle housing;
a conductive spindle shaft rotatably supported inside the spindle housing;
a conductive disk-shaped rotating member provided at one end of the spindle shaft and configured to be rotatable on a surface of the spindle housing on one end side of the spindle shaft;
a cover member attached to the spindle housing and configured to cover an outer peripheral surface of the disk-shaped rotating member;
a flow passage formed in the cover member and configured to flow a gas from outside of the cover member to a clearance between the disk-shaped rotating member and the cover member; and
a conductive movable member provided on the cover member or the spindle housing so as to be electrically connected to a ground and configured to be moved by the gas flowing through the flow passage and thereby brought into contact with the disk-shaped rotating member.

2. The spindle device according to claim 1, wherein the flow passage is a flow path for flowing the gas that seals the clearance.

3. The spindle device according to claim 1, wherein the movable member has resilience and is configured to be bent by the gas flowing through the flow passage and thereby contact the disk-shaped rotating member.

4. The spindle device according to claim 1, wherein the movable member is formed into a plate shape, and one end side of the movable member is detachably fixed to the cover member while another end side thereof is moved by the gas flowing through the flow passage.

5. The spindle device according to claim 4, wherein the other end side of the movable member is disposed so as to close part of an outlet of the flow passage.

\* \* \* \* \*